United States Patent [19]

Holloway et al.

[11] 4,122,868
[45] Oct. 31, 1978

[54] HYDRAULIC VALVE ASSEMBLY HAVING AN AXIAL FLOW FORCE BALANCED SPOOL

[75] Inventors: Gale A. Holloway, Joliet; Rudolph Yeh, Elmhurst; Joseph L. Zagotta, Chicago, all of Ill.

[73] Assignee: International Harvester Company, Chicago, Ill.

[21] Appl. No.: 761,758

[22] Filed: Jan. 24, 1977

Related U.S. Application Data

[63] Continuation of Ser. No. 544,030, Jan. 24, 1975, abandoned, and a continuation-in-part of Ser. No. 365,649, May 31, 1973, abandoned.

[51] Int. Cl.² ...................... F15B 13/04; F16K 11/07
[52] U.S. Cl. ............................ 137/625.69; 137/625.3
[58] Field of Search .................... 91/418, 462, 466; 137/596.12, 596.13, 625.3, 625.69, 625.34, 625.37

[56] References Cited

U.S. PATENT DOCUMENTS

| 430,042 | 6/1890 | Sague | 137/625.3 |
|---|---|---|---|
| 2,212,343 | 8/1940 | Goehring | 137/625.3 X |
| 2,718,240 | 9/1955 | Margrave | 137/625.69 |
| 2,783,745 | 3/1957 | Stephens | 137/625.69 |
| 2,812,775 | 11/1957 | Hodgson | 137/625.34 X |
| 2,856,960 | 10/1958 | Stacey | 137/625.69 X |
| 2,914,088 | 11/1959 | Beaman et al. | 137/625.3 |
| 2,969,809 | 1/1961 | Klinger | 137/625.3 |
| 2,971,536 | 2/1961 | Junck et al. | 91/466 X |
| 3,009,480 | 11/1961 | Miller | 137/625.69 |
| 3,123,335 | 3/1964 | Darling | 251/325 |
| 3,138,175 | 6/1964 | Chilcoat | 137/625.3 |
| 3,160,174 | 12/1964 | Schmiel et al. | 137/625.69 X |
| 3,198,212 | 8/1965 | Junck et al. | 137/625.69 X |
| 3,267,966 | 8/1966 | Williams | 137/625.69 |
| 3,423,136 | 1/1969 | Lohbauer | 137/625.3 |
| 3,483,890 | 12/1969 | Oldenburg et al. | 137/596.12 |
| 3,556,155 | 1/1971 | Morris et al. | 137/625.3 |
| 3,563,137 | 2/1971 | Graber et al. | 137/596 X |
| 3,901,264 | 8/1975 | Stephens | 137/596.12 X |

Primary Examiner—Irwin C. Cohen
Attorney, Agent, or Firm—Raymond E. Parks; Frederick J. Krubel; F. David AuBuchon

[57] ABSTRACT

A directional flow control spool in an open center flow type of valve is provided with primary and secondary flow metering notches in the path of the center flow. The secondary metering notches provide an additional force which assists in the axial shifting of the control spool from a central neutral position.

8 Claims, 6 Drawing Figures

PRIOR ART
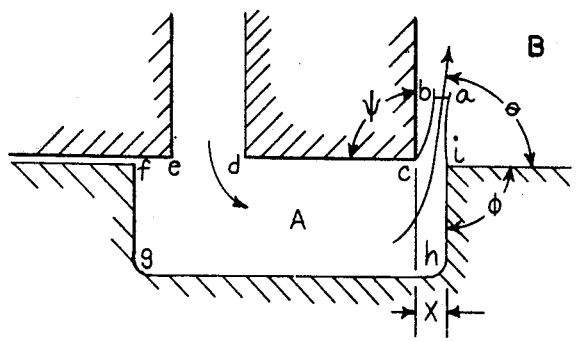
FIG-4-
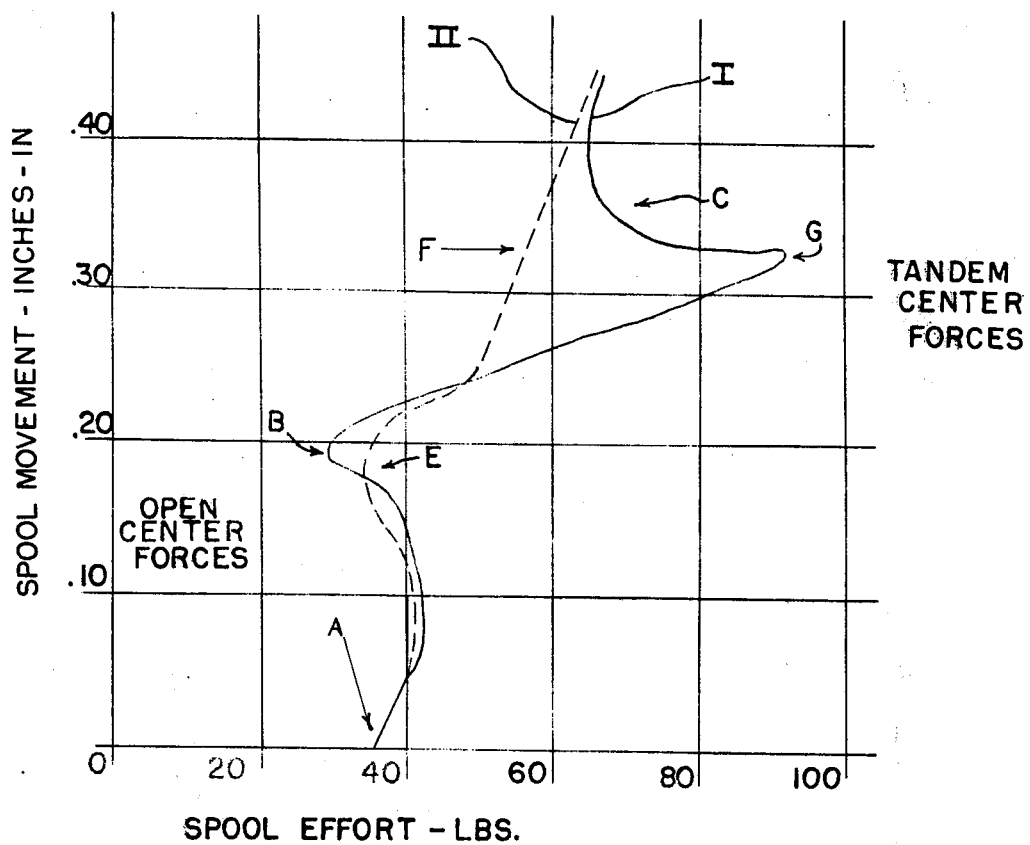
FIG-5-

HYDRAULIC VALVE ASSEMBLY HAVING AN AXIAL FLOW FORCE BALANCED SPOOL

This is a continuation of application Ser. No. 544,030, filed Jan. 24, 1975, and now abandoned and a continuation-in-part of U.S. patent application Ser. No. 365,649, filed on May 31, 1973, and now abandoned.

This invention relates to a hydraulic power transmitting apparatus and particularly to a hydraulic valve having a spool or plunger means for controlling the direction of fluid flow.

The fluid control valve of this invention is incorporated in a fluid circuit of the type having a fluid actuated motor, fluid input conduit means for connecting a source of fluid to the input sides of the control valve and the motor, and fluid exhaust conduit means for connecting a fluid return reservoir to the output sides of the control valve and the motor. The control valve includes a body portion or housing having a bore, a bifurcated cavity communicating with the bore through a port, a central fluid plenum chamber communicating the port to the bore, a pair of exhaust chambers on opposite sides of the central chamber for exhausting the central chamber, and a pair of directional flow chambers for charging and discharging the input and output sides of the motor, and a spool valve means slidably carried in the bore for controlling the flow of fluid into the port from a source of fluid.

The valve spool as it is reciprocated within the bore is subjected to radial and axial forces. For the most part due to the symmetrical construction of the spool the radial forces balance out such that they do not influence spool actuation. However, the axial forces, which are produced as a result of fluid momentum change are not so easily disposed of as evidenced by the teachings in the U.S. Pat. No. 3,009,480 to Miller and No. 2,812,775 (U.S. Pat. No. Re. 24,580) to Hodgson.

The axial forces that operate on a valve spool include the inertial force, which is readily calculated and is usually small, the frictional forces, which are not accurately calculable but which should also be small in a properly designed and properly applied valve, and various forces which owe their existence to the fact that fluid is flowing through the valve exerting axial forces on the spool. These last mentioned forces are known as flow forces, the origin of which can be most easily understood from a brief explanation. The lands of the spool in conjunction with those in the valve bore create variable metering orifices between the upstream and downstream fluid carrying chambers. Normally one set of lands will be restricting the fluid flow either as it opens or closes. It is this act which is responsible for generating the flow forces. When both of the sets of lands are normally open the flow velocity generated is minimal.

Assuming a steady fluid flow and constant pressure, as would be found in the control valve assembly, movement of the spool decreases the cross sectional area of the flow across the variable orifice. Accordingly, fluid moves through this region at increasing velocities, and following Bernoulli's principle this region has a low pressure. A detailed discussion of FIG. 4 is found in a publication entitled FLUID POWER CONTROL, edited by Blackburn, Reethof and Shearer, and published jointly by the Technology Press of the Massachusetts Institute of Technology and John Wiley and Sons Inc., with a 1960 Copyright. The article appears in Chapter 10, Steady-State Operating Forces, starting on page 297 and is herewith incorporated by reference thereto.

Steady-state flow forces have been recognized for years, and various schemes have been suggested for reducing or eliminating them. Some of these methods have been completely ineffective or impractical, and others have been partially successful, but no means have been described which will give complete compensation for all conditions of flow and pressure drop.

A typical open center valve curve I plotting spool displacement vs. spool effort is shown in FIG. 5. Since this curve will be more fully explained, it suffices at this time to state that section A-B represents the forces acting on the center piston of the spool and section B-C represents the forces acting on the directional control pistons.

Most of the schemes that have been proposed for the compensation of flow forces fall into one or the other of two categories: either the incoming jet is deflected in such a way that it leaves the piston chamber with the same axial momentum at which it entered or else this momentum is caught and transferred to the bore by some sort of vane or other member which projects into the piston chamber. In a spool valve, the provision of the vane leads to annoying, if not, serious problems in fabrication and assembly. Further, if any forces are compensated, they are compensated only for one of the two contributive sources. That is, either for the forces at the open center chamber or for the forces at the tandem directional flow chambers, but not both.

The data as embodied in curve II shown in FIG. 5, demonstrates the forces involved as the operator displaces the spool of the present invention. The prior art as evidenced by Junck et al U.S. Pat. No. 2,971,536 relates only to the open center forces, that is, section A-B in curve I which corresponds to A-E in curve II. The same can be said of Miller U.S. Pat. No. 3,009,480 and Hodgson U.S. Pat. No. Re 24,580. As is apparent, this is a solution to only a part of the axial forces generated during spool movement.

It is therefore an object of this invention to provide a hydraulic valve wherein the open center chamber flow forces are reduced and extended over a longer spool movement and the tandem chamber directional flow forces are balanced at point F against the secondary or reduced open center forces shown at B-G.

Yet another object of this invention is to provide a hydraulic valve spool having open center metering notches formed to create a low pressure sink.

Still another object of this invention is to provide a hydraulic power transmitting apparatus having a valve which requires linearly increasing actuating force over the spool travel.

In accordance with this invention a hydraulic power transmitting apparatus is provided and includes: a hydraulic control valve, a hydraulic motor and a source of fluid pressure. The hydraulic valve controls the direction of fluid flow by means of a shiftable spool means which opens and closes outlets and inlets according to a predetermined timing. In order to decrease the generation of open center flow forces, the center flow spool is provided with compound primary and secondary metering notches. The primary notches provide low pressure generating areas which tend to turn the jet angle (shown in FIG. 4) near 90°. The secondary metering notches provide additional or secondary open center forces which balance the forces at the directional flow chambers, thus creating an overall work cycle having few operator actuation force variations.

Other objects and advantages of the invention will become apparent upon reading the following detailed description and upon reference to the drawings, in which:

FIG. 1 is a sectional view of a control valve with the control valve showing one embodiment of the compound primary and secondary metering notches on the center piston;

FIG. 2 is a view of the spool showing a second embodiment of the compound primary and secondary metering notches;

FIG. 3A is an enlarged sectional view showing a third embodiment of the compound primary and secondary metering notches; and FIG. 3B shows the third embodiment of the secondary metering notches with a fourth embodiment of the primary metering notch means;

FIG. 4 is an illustration from the STEADY-STATE OPERATING FORCES reference book; and FIG. 5 is a chart showing the curves of spool effort verses spool travel of the prior art spool as compared to that of the invention.

BRIEF DESCRIPTION OF THE DRAWING

Referring now to the various figures of the drawing and in particular to FIG. 1 wherein is shown a flow control valve means 10 of the open center flow type, a fluid source means 12, a fluid inlet conduit means 14, 14a and 14b and a hydraulic power cylinder unit or motor means 16. The fluid source or pump means 12 and the double acting hydraulic cylinder means 16 as well as the conduit means 14, 14a and 14b interconnecting the relative components are all standard items well known in the art and therefore no further discussion will be devoted thereto. The hydraulic control valve means 10 includes: a housing or body 18, reversible flow ports 20 and 22, inlet flow port 24 including passageway 24a and 50, a bore of a uniform diameter 26 including a spool 28 slidably mounted therein, and a plurality of pairs of fluid channeling means 30–32, 36–36R, 38–40 and 42–44 similar to that shown and described in U.S. Pat. No. 2,718,240 — Margrave — Sept. 20, 1955 which will be more fully explained hereafter. The series of channel means whereby input fluid from the source 12 is directed to one end of the hydraulic cylinder means 16 and simultaneously exhausted from the other end of the fluid motor 16 includes: input port 24, passageway 24a which communicates with the center chamber 34, exhaust chamber means 30 and 32, crossover or input flow control passage means 36–36R, reversible flow chambers 38–40 and discharge chambers 42–44. The discharge chambers 42 and 44 are provided with plugs 46 which may have anticavitation devices or relief valves incorporated therein. Plugs 46 and 48 under normal circumstances prevent the passage of fluid between chambers 38 and 42 and chambers 40 and 44.

As explained previously the axial flow forces involved during the work cycle of the spool 28 can be divided into two groups: the center chamber flow and the alternate or reversible chambers flow forces. The center chamber flow forces originate between chamber 34 and chambers 30 or 32 and the alternate or reversible chambers flow forces occur between chambers 36–38 and 40–44 or between chambers 36R–40 and 38–42 depending on the direction of flow according to the setting of the spool means 28. The spool 28 has a center flow control piston 56 between a pair of input directional flow control pistons 66 and 68, and two sets of discharge directional flow control pistons 52 and 54. The center flow is controlled by piston 56 which has left and right control edges 76 and 78, and by the inboard control edges 74 and 80 of the pair of directional flow control pistons 66 and 68. The direction of the input flow is controlled by the outboard control edges 88 and 88R; and the direction of the discharge flow is controlled by the inboard control edges 86 and 86R. The direction of the input flow is controlled by the outboard control edges 88 and 88R; and the direction of the discharge flow is controlled by the inboard control edges 86 and 86R. The spools are axially separated by shanks 58, 82, 84 and 60. The center chamber is separated from the exhaust chambers 30 and 32 by annular lands 70 and 72; the tandem or bifurcated input chambers 36 and 36R are separated from the alternate input flow chambers 38 and 40 by annular lands 94 and 94R; and the reversible discharge flow chambers 42 and 44 are separated from the alternate flow chambers 38 and 40 by annular lands 96 and 96R. Each of the control edges on the spools 52, 66, 56, 68 and 54 merges with its respective shank portion 58, 82, 84 and 60 with a small radius fillet. Upon axial shifting of the spool valve 28 either to the right or the left, the control edges on the spools or pistons pass into the respective annular control lands between the chambers to control the flow of fluid to and from the double-acting hydraulic cylinder ram 16.

Figure 1:
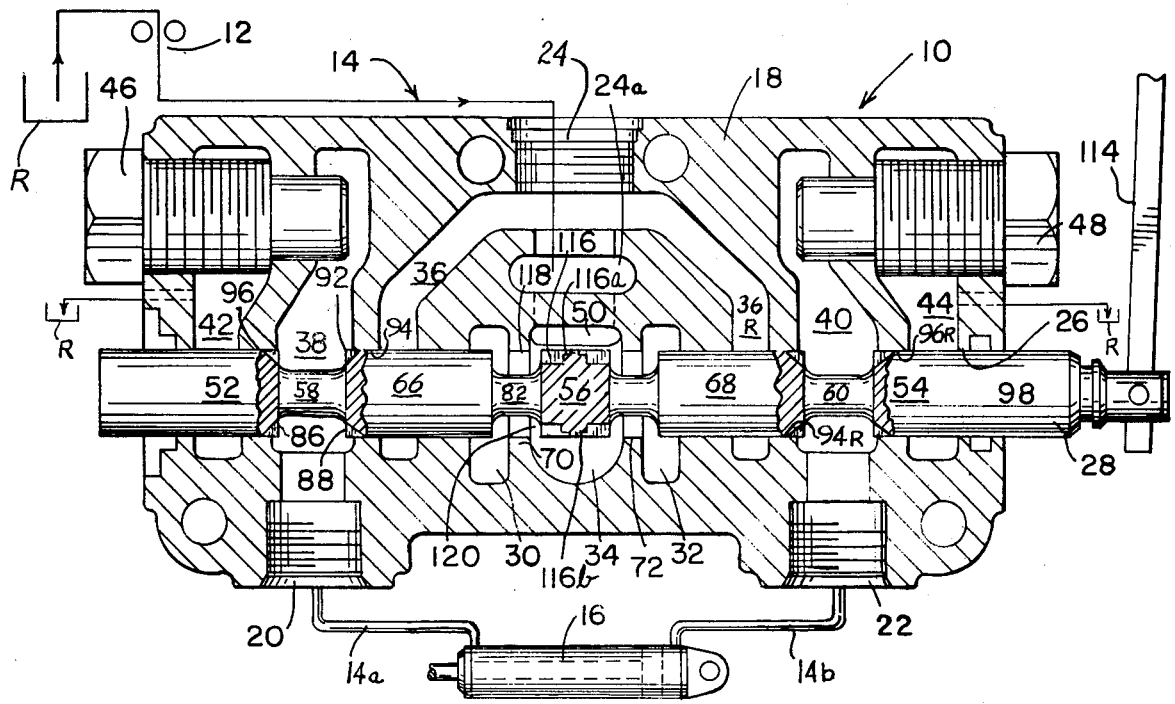

In the embodiment shown in FIG. 1, the center flow control piston 56 is provided with a compound metering notch 116 and 116a for the left control edge 76, and a similar compound metering notch for the right control edge 78. The facing control edges 86–88 and 86R–88R are each provided with a metering notch 98–92 and 98R–92R respectively. As shown, metering notches are provided on diametrically opposite sides on the circumference of the pistons 52, 66, 56, 68 and 54. Discussion will be limited to one of the symmetrically arranged notches. In the embodiment shown in FIG. 2, the center flow control piston 56 is provided with side-by-side notches. The primary metering notch 62 is equivalent to metering notch 116 in the FIG. 1 embodiment, and the secondary or additional notch 64 is equivalent to 116a. The third embodiment shown in FIG. 3 provides the primary and secondary metering notches on the same side control edges of the three center flow control edges 76–80 and 78–74. Control edge 76 has the secondary metering notch 106a and control edge 80 has the primary metering notch 112. Similarly control edge 78 has the secondary metering notch 106b and control edge 74 has primary metering notch 102.

Figure 2:
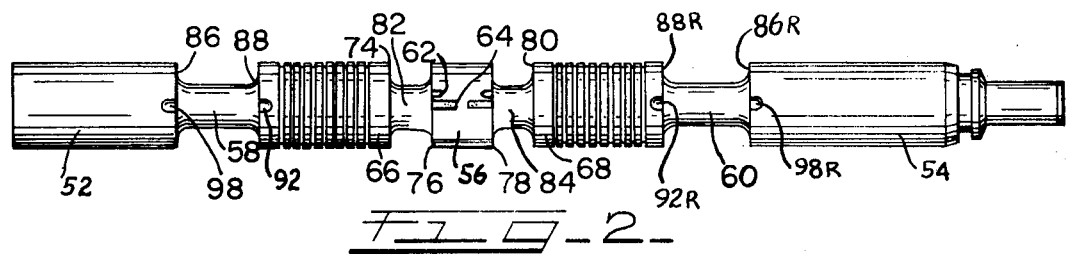
Figures 3A, 3B:
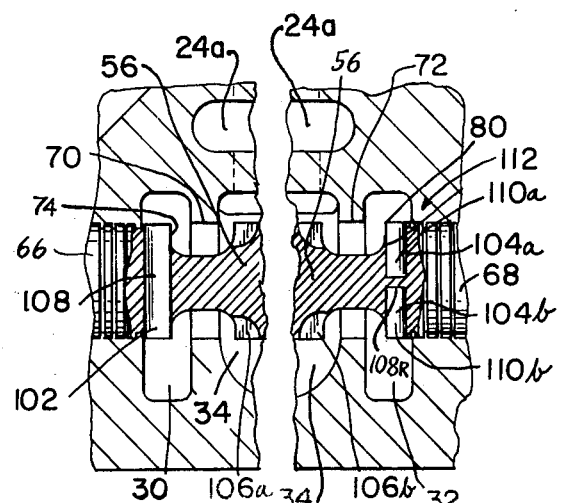

The three embodiments of metering notches shown in FIGS. 1 to 3 are classified into two groups by the function they perform. That is, the primary metering notches, 116, 62 and 102/112 are directed to the reduction of axial forces created by the center flow control edges and the respective lands. The additional or secondary metering notches 116a, 64 and 106a/106b are directed toward creating forces simultaneously but opposite in direction with those created by the input-discharge flow control edges and the respective lands, such as those created when control edge 86 and its metering notch 98 moves to the left of the annular land 96 between discharge chamber 42 and reversible flow chamber 38. In FIG. 5 these forces are represented at F by curve II. The particular arrangement of the three embodiments of the primary and secondary metering notches, as disclosed in the parent United States patent application, Ser. No. 365,649, in regard to which land or a series of spool lands they are formed on, depends on choice. FIG. 1 shows the primary and secondary notch means 116 and 116a as a compound notch means; FIG. 2 shows the primary and secondary notch means 62 and 64 in side by side relationship; and FIGS. 3A and 3B shows the primary and secondary notch means 102, 112 and 106a/106b separated and on three separate pistons 66, 56 and 68.

The primary metering notch means 102 and 112 shown in FIGS. 3A and 3B are more fully discussed in co-pending application Ser. No. 365,648 filed on May 31, 1973. The common feature which the two types of metering notches 102 and 112 possess is a low pressure area at the midpoint 108 and 108R of the radially extending cavity or hole, which is formed by the aspiration of fluid. As the control edge 74 or 80 approaches its respective land 70 or 72, the flow is metered by the orifice formed between the edge and the land. The flow adjacent to the cavity 102 or 112 entraines fluid from within the cavity and generates a low pressure in the cavity at 108 and 108R. Since the pressure in the cavity is below the ambient pressure, fluid is forced to bend and exit adjacent to the wall of the discharge chamber 30 or 32. This results in a jet angle which is greater than $\theta$ shown in FIG. 4. In other words, as the flow velocity increases or accelerates past the cavity 102 or 112, the pressure drops in the cavity sufficient to cause a bending of the flow by the ambient pressure such that the flow exits from metering notch means 102 or 112 substantially radial to the axis of the spool. As the cosine of jet angle $\theta$ approaches zero, the axial displacement forces being exerted on the spool valve 28 approach zero. The flow induced forces which act on the spool valve, act in the direction to close flow between the metering notch and an adjacent land as the control edge slides into the land.

The secondary metering notch means 116a, 64 and 106a and 106b are timed to be of an axial length such that flow through the secondary notch and an associated land remains open until after the flow control edges 86 or 86R and 88 or 88R have cleared or seated their respective lands. The secondary metering notch means create axial displacement forces which tend to slide the reversible flow control pistons in a direction to open communication from the source 12 to one end of the double acting hydraulic cylinder 16 and from the opposite end to the reservoir R. In other words, the secondary metering notch means generate axial displacement forces in a direction opposite to those being generated by the reverse flow control edges and respective control lands.

From the neutral position of the spool valve 28 shown in FIG. 1 assume the operator wishes to actuate the mechanical device associated with the double-acting hydraulic cylinder 16. Assume further that the desired movement can be achieved by sliding or moving the spool valve 28 to the left by the actuation of lever means 114. As a result reversible flow port 22 will function as the fluid inlet port and reversible flow port 20 will function as a fluid discharge port. Fluid will thus flow from input port 24 into the right branch 36R of the bifurcated channel, into reversible flow chamber 40, into port 22 and through conduit 14b and charge the right side of cylinder 16 with fluid. The fluid which is in the left side of the cylinder will discharge into line 14a as the ram extends and flow into reversible flow chamber 38, into discharge chamber 42 and into the reservoir R. Due to the nature of the timing of spool valve means 28, the left control edge 76 of the center flow control piston 56 and the left control edge 80 of the left spool 68 begin to restrict fluid flow between the center chamber 34 and the two exhaust chambers 30 and 32 as the edges approach the annular land means 70 and 72 prior to the opening of input metering notch 88R and discharge notch 98. That is the flow area or space between the control edges 76 and 80 and the lands 70 and 72 is decreasing. This is shown in FIG. 5 as Section A-E of curve II. Curve I is a plot of spool effort verses distance for a spool which has not been modified according to this invention.

There is no flow to or from the hydraulic cylinder 16 until the input and discharge flow metering notches 92R and 98 have passed the effective sealing area of their respective annular land seats 94R and 96. When the input flow metering notch 94R opens communication between chamber 36R and 40 immediate axial forces are produced in a direction tending to close such communication. This is shown at point B on curve I. The provision of the secondary metering notch means 116a, 64 or 106a and 106b operate to produce a counterbalancing force as shown at E in Curve II. Fluid which passes through the secondary metering notch acts to shift the spool valve further to the left until point F is reached. Without the assistance of the secondary metering notch means the force required to shift the spool valve 28 to the left until the input metering notch 92R clears the land 94R is shown from B to G in Curve I. Once the control edge 88R clears the land 94R the force of the input fluid now acts on the control edge 88R so that further shifting of the spool valve 28 is accomplished with relative lesser effort as shown at G to C in Curve I. A comparison of Curve II with Curve I shows that the secondary metering notches 116a, 64 and 106a and 106b provide a smooth and effortless shifting of the spool valve 28 in either axial direction from the central neutral position.

The embodiments of the invention in which an exclusive property or privilege is claimed are defined as follows:

1. A directional fluid flow control valve comprising:
   a housing having left and right sides, a fluid flow inlet chamber centered in the housing between a pair of left and right fluid exit chambers;
   a first pair of left and right wall members separating the inlet chamber from the exit chambers;
   a second pair of left and right wall members respectively separating a pair of left and right alternating fluid flow input chambers from a pair of left and right alternating fluid flow receiving chambers; and
   a third pair of left and right wall members respectively separating a pair of left and right alternating fluid discharge chambers from the pair of alternating fluid flow receiving chambers;
   the three pairs of wall members having an axially extending cylindrical bore therethrough respectively forming first, second and third pairs of fluid flow control lands in the wall members; and
   a cylindrical valve member slidably carried in the bore and having a central fluid flow position between a fluid flow left position and a fluid flow right position;

a first pair of axially spaced apart annular flow control grooves in the valve member forming a central spool valve element having left and right control edges located within the inlet chamber in the central fluid flow position and forming a first pair of left and right spool valve elements each having a first control edge respectively located within the left and right exit chambers, the left and right control edges on the central spool valve element respectively facing the first control edges on the first pair of left and right spool valve elements and defining a first pair of facing left and right control edges on opposite axial sides of the central spool valve element adapted to block fluid flow past the first pair of control lands between the inlet and exit chambers as the valve member is axially moved from the central fluid flow position to either the left or right fluid flow position;

a second pair of axially spaced apart annular fluid flow control grooves in the valve member forming ends of the first pair of left and right spool valve element and starts of a second pair of left and right spool valve elements, the starts of the second pair of spool valve elements having a set of control edges respectively facing a set of control edges on the ends of the first pair of spool valve elements, the two sets of control edges defining a second pair of facing left and right control edges, the ends of the first pair of spool valve elements blocking fluid flow past the second pair of control lands between the input and receiving chambers and the second pair of spool valve members blocking fluid flow past the third pair of control lands between the receiving and discharge chambers in the central fluid flow position, the second pair of facing control edges adapted to open fluid flow past one control land of the second pair of control lands on one side of the housing and to open fluid flow past one control land of the third pair of control lands on the other side of the housing and vice versa as the valve member is axially moved from the central fluid flow position to either the left or right fluid flow position;

first fluid metering means on one set of the first pair of facing control edges and second fluid metering means on both sets of the second pair of facing control edges for providing first and second primary restrictive flows respectively past one control land of the first pair of control lands and past the one control land of the second and third pairs of control lands and vice versa as the valve member is initially moved from the central fluid flow position towards either the left or right fluid flow position for reducing reactionary force exerted on the valve member by the momentum of the fluid flow between the inlet and exit chambers and between one input and one receiving chamber on one side of the housing and between the other receiving and one discharge chamber on the other side of the housing;

additional fluid metering means on the set of control edges of the center spool valve element for providing a secondary restrictive flow past the one control land of the first pair of control lands after the first fluid metering means is substantially blocked by said one control land upon continued movement of the valve member in the same axial direction, the additional fluid means having a channel of an axial length such that the secondary restrictive flow therethrough further balances the reactionary force produced on the valve member by the momentum of the second primary restrictive fluid flow past the one control land of the second pair of control lands on one side of the housing and past the one control land of the third pair of control lands on the other side of the housing.

2. A directional fluid flow control valve as claimed in claim 1 wherein the first fluid metering means is on the set of control edges on the center spool valve element.

3. A directional fluid flow control valve as claimed in claim 2 wherein the first fluid metering means are axial extending notches and the channels of the additional fluid metering means overlay and axially extend beyond the terminal ends of the notches.

4. A directional fluid flow control valve as claimed in claim 1 wherein the first fluid metering means is on the set of control edges on the first pair of spool valve elements.

5. A directional fluid flow control valve as claimed in claim 4 wherein the first metering means are radially extending holes adjacent the set of control edges on the first spool valve member facing the set of control edges on the center spool valve member.

6. A directional fluid flow control valve as claimed in claim 5 wherein the holes extend diametrically through the first pair of spool valve elements.

7. A directional fluid flow control valve as claimed in claim 5 wherein the holes are provided on diametrical opposite sides of the first pair of left and right spool valve elements and bottom out proximate the axis of the cylinderical valve member.

8. A directional fluid flow control valve as claimed in claim 2 wherein the first fluid metering means are notches positioned side-by-side of the channels of the additional fluid metering means, and the channels extending axially beyond the notches towards the middle of the center spool valve element.

* * * * *